UNITED STATES PATENT OFFICE.

WILLIAM MUNRO SANDISON, OF ASHFIELD, AYTON, SCOTLAND, ASSIGNOR OF ONE-HALF TO HERBERT G. McKERROW, OF NEWTON, MASSACHUSETTS.

PROCESS FOR THE PREVENTION AND LAYING OF DUST IN ROADS, &c.

No. 813,389.     Specification of Letters Patent.     Patented Feb. 20, 1906.

Application filed February 28, 1905. Serial No. 247,833.

REISSUED

*To all whom it may concern:*

Be it known that I, WILLIAM MUNRO SANDISON, a subject of His Majesty the King of Great Britain, residing at Ashfield, Ayton, in the county of Berwick, Scotland, have invented a certain new and useful process for the prevention and laying of dust through the application to roads or road material of an aqueous emulsion of wool-washing suds or of wool-fat or wool-wax, with or without the addition thereto of a disinfecting-oil, of which the following is a specification.

The object of this invention is the prevention or laying of dust on road and street surfaces, in the workings of mines, on the road-beds of steam or electrically equipped railways, in portions of factories, and elsewhere through the employment of a sprinkling or saturating medium whose composition can be adjusted to the varying nature of the surfaces or road-making material to which it is to be applied and to the quantity and quality of dust liable to be produced thereon, while combining a hygroscopic action with less liability to dispersion by atmospheric or other influences than is the case with the simple sprinkling media, such as oils or watery emulsions of oils, which have heretofore been used. My invention is such utilization of the natural product known as "wool-fat" or "wool-wax," which in the presence of an alkali possesses in a high degree the property of emulsification with water and has an affinity for oily matter that may be mingled with it. Unwashed wool contains this waxy substance along with potash salts and fine sand charged with oleaginous matter which the familiar process of washing by means of soap liberates in the form of suds. To render such suds still more suitable for use on road or other surfaces or with road-making material for the purpose in question, I add thereto an appropriate quantity of suitable oil or grease or oil-like substance, preferably such as possesses disinfectant properties—as, for example, creosote—which tends to render the hygroscopic salts still more deliquescent; but other disinfectant substances suitable for the deodorization of road or street refuse may be employed. Such treated suds applied by means of watering-carts or other sprinkling or saturating apparatus are readily absorbed by dust, dry soil, or the like, to the particles of which the wool-fat or wax adheres tenaciously, while the mineral matter contained in it and deposited in the interstices of road metal or street paving adds to its dust preventive or laying powers which become further augmented by the hygroscopic action of the potash salts in abstracting and retaining moisture from the atmosphere, so that after even a slight dew the treated surfaces appear moist for hours after untreated surfaces have become dry. Obviously from their bulk the economical use of such disinfectant suds is practicable only in the immediate vicinity of wool-washing establishments. For more remote use freight considerations render a concentrated condition necessary. To comply with this, the suds are condensed, as by evaporation. After condensation to render them still more suitable for my purpose I mix them with suitable oils or other substances, as those above indicated, to such a degree of consistency that the semiliquid mass can be afterward readily further diluted by water to the degree necessary for its application by means of the spraying or saturating apparatus. In some cases I similarly utilize and treat with oil or other substances, such as aforesaid, concentrated or other suds from which the more valuable portion of the wool-fat or wax has been abstracted by centrifugal action or otherwise, leaving a solution containing some lower grade wool-grease along with soap, potash salts, and a very fine mineral matter. I similarly utilize and treat in their weak or concentrated form suds lacking or poor in potash salts owing to the removal thereof from the wool by the well-known system of steeping in water before soap-washing operations commence. In such cases I usually add deliquescent salts to secure the desired hygroscopic action. I also make use of commercial wool grease or wax—for instance, such as is produced by the French battage system and by the acid-cracking, evaporation followed by settling and skimming, evaporation followed by centrifugal treatment, and the naphtha or other solvent processes, all well-known processes—and I also utilize such impure combinations of wool grease or wax as may result from those recovery processes which treat wool-washing suds in combination with other trade and domestic effluents. Such greases or waxes I emulsify with water to any required extent by using suitable alkali, preferably carbonate of potash on account of its hygroscopic nature. I usually add a suitable quantity of oil or other substances, such as are hereinbefore mentioned as being added to suds, and I regulate the density of the solution as required. To effect the more durable lodgment of the material in the crevices and interstices of the surfaces to be treated, I sometimes further add to the emulsion or solution finely-divided sand or other mineral matter, the quantity of which may be varied, but is such as not to materially interfere with the liquid nature of the emulsion or solution.

In some cases I may give additional body to the suds and greasy or waxy solutions hereinbefore described by incorporating therewith suitable mineral matter of an absorbent and grease-retaining nature, as fullers' earth.

The strength of the emulsions or solutions and the proportions of the various substances mentioned present therein can be varied within wide limits without departing from the essential feature of the invention.

Instead of treating ready-formed roads or the like with preparations produced as hereinbefore described I may in some cases treat stone paving, road metal, or other road-making material prior to its use in road construction or repairing operations or during its use in the construction or repairing operations with such preparations.

For the treatment of wood paving, which the sprinkling of oily or greasy solutions would render slippery to a dangerous degree, I treat sand or other suitable mineral matter, such as is commonly scattered in wet or frosty weather, over such surfaces with a preparation such as hereinbefore described, so that after the so-treated sand or the like has been applied to the wood paving the gritty particles will not only act freely in preventing a slippery condition from arising, but will retain sufficient of the medium to minimize the raising of dust during dry weather.

As will be obvious, such treatment as last described is applicable not merely to wood paving, but also to asphalt or other pavement in cases where for the reason stated the direct use of emulsions or solutions such as hereinbefore described would be inadmissible.

The amount of the emulsion or solution used on a road, street, or other surface for the purpose set forth can of course be widely varied according to the local conditions prevailing.

A disinfectant may be added to each of the emulsions or solutions hereinbefore described, so that such emulsions or solution shall act not only to prevent or lay dust on the road, street, or other surface, but also to disinfect such road, street, or other surface.

I claim—

1. The process herein described for laying dust, which consists in the application to the surface of roads or pavement dressing of an aqueous emulsion obtained by combining wool-fat with an alkali or alkaline salt, substantially as described.

2. The process herein described for laying dust, which consists in the application to the surface of roads or to pavement dressing of an aqueous emulsion obtained by combining wool-fat with an alkali or alkaline salt, and an oil-like substance, preferably creosote, substantially as described.

3. The herein-described process for the prevention of dust, which consists in the application to the surface of roads or to a road dressing, of a water-diluted emulsion obtained by combining wool-scouring suds with a suitable oil, or oil-like substance, preferably possessing disinfectant properties, as for example creosote, substantially as described.

4. The process of laying dust, which consists in the application to or saturation of the surface by a substance obtained by concentrating wool-scouring suds and combining with it an oil-like substance, preferably creosote, to produce a mass of semiliquid consistency, dilutable by water, for the purpose specified.

5. The process of preventing dust, which consists in the application to the surface of roads or to a road dressing of a substance obtained by concentrating wool-scouring suds, and adding to such suds as are lacking or poor in natural potash salts, a deliquescent salt, and combining with it an oil-like substance, preferably creosote, to produce a mass of semiliquid consistency dilutable by water, for the purpose specified.

6. The process of laying dust, which consists in the application to the surface of roads of an aqueous emulsion of wool-fat combined with alkali or alkaline salt preferably of a deliquescent nature, and containing in addition fine mineral matter of an absorbent and grease-retaining nature, substantially as specified.

7. The process of treating wool-scouring suds by concentrating the same and subsequently incorporating therewith an oil-like substance, preferably creosote, to produce a mass of semiliquid consistency capable of dilution by water, substantially as specified.

8. The process of treating wool-scouring suds by concentrating the same, by the adding to such concentrated suds as are lacking or poor in natural potash salts of a deliquescent salt, and by combining therewith an oil-like substance, preferably creosote, to produce a mass of semiliquid consistency dilutable by water, substantially as specified.

9. The process of treating wool-fat by adding suitable alkali or alkaline salt, preferably of a deliquescent nature and by combining therewith an oil-like substance, preferably creosote, to produce a mass of semiliquid consistency dilutable by water, substantially as specified.

10. The process herein described for laying dust, which consists in the application to the surface of roads of an aqueous emulsion obtained by combining the concentrated greases, fats or waxes recovered from trade or domestic effluents or wastes with an alkali or alkaline salt, substantially as described.

11. The process for preventing dust, which consists in the application to a surface of an aqueous emulsion of animal greases, fats or waxes combined with an alkali or alkaline salt, substantially as described.

12. The process for preventing dust, which consists in spraying a surface with a water-diluted emulsion composed of animal greases or fats, an alkali or alkaline salt, preferably of a deliquescent nature, and an oil-like substance, preferably creosote, substantially as described.

WILLIAM MUNRO SANDISON.

Witnesses:
CHARLES ORDWAY,
ALFRED RINDSKOPF.